US009844965B1

(12) United States Patent
Lemay et al.

(10) Patent No.: US 9,844,965 B1
(45) Date of Patent: Dec. 19, 2017

(54) REUSABLE NOTEBOOK

(71) Applicant: Rocket Innovations, Inc., Melrose, MA (US)

(72) Inventors: Joseph Lemay, Melrose, MA (US); Jacob Epstein, Medford, MA (US)

(73) Assignee: Rocket Innovations, Inc., Melrose, MA (US)

( * ) Notice: Subject to any disclaimer, the term of this patent is extended or adjusted under 35 U.S.C. 154(b) by 0 days.

(21) Appl. No.: 15/289,148

(22) Filed: Oct. 8, 2016

Related U.S. Application Data (60) Provisional application No. 62/238,908, filed on Oct. 8, 2015, provisional application No. 62/303,892, filed on Mar. 4, 2016.

(51) Int. Cl.

| | |
|---|---|
| *B44F 1/10* | (2006.01) |
| *B42D 3/12* | (2006.01) |
| *B42D 1/00* | (2006.01) |
| *B42D 15/00* | (2006.01) |
| *B42F 3/04* | (2006.01) |
| *G01K 11/18* | (2006.01) |
| *B43L 1/00* | (2006.01) |
| *B42D 25/29* | (2014.01) |
| *B41M 5/28* | (2006.01) |

(52) U.S. Cl.
CPC ............ *B42D 3/123* (2013.01); *B42D 1/008* (2013.01); *B42D 15/0006* (2013.01); *B42F 3/04* (2013.01); *G01K 11/18* (2013.01); *B41M 5/282* (2013.01); *B42D 15/00* (2013.01); *B42D 25/29* (2014.10); *B43L 1/00* (2013.01)

(58) Field of Classification Search
CPC ........ B41J 2/4753; B42D 15/00; B42D 25/29; B42D 2033/20; B41M 5/282; B43L 1/00
USPC ....................... 428/29; 283/67, 70
See application file for complete search history.

(56) References Cited

U.S. PATENT DOCUMENTS

| | | | | |
|---|---|---|---|---|
| 4,725,462 | A * | 2/1988 | Kimura | A63H 3/02 283/97 |
| 5,786,838 | A * | 7/1998 | Steinhauser | B41M 5/282 347/179 |
| 5,873,604 | A * | 2/1999 | Phillips | B42D 25/29 283/58 |
| 5,984,364 | A * | 11/1999 | Diamond | B41M 3/10 283/58 |
| 6,030,000 | A * | 2/2000 | Diamond | B41M 3/10 283/57 |
| 6,346,024 | B1 * | 2/2002 | Engel | A63H 23/00 401/1 |

(Continued)

*Primary Examiner* — Shin Kim
(74) *Attorney, Agent, or Firm* — Sunstein Kann Murphy & Timbers LLP (57) ABSTRACT

A reusable notebook is used with heat-erasable ink. The reusable notebook includes a binding configured to hold a plurality of pages, at least one cover, and at least one ready indicator. The ready indicator is configured to indicate that at least one page in the notebook has reached at least a critical temperature. The critical temperature is a predetermined minimum temperature that is sufficient to erase thermochromic ink on the page(s). The indication occurs when the ready indicator is at a temperature equal to or above a predetermined minimum temperature referred to as the ready temperature. When the ready indicator is at or above the ready temperature, the critical temperature of the at least one page is reached.

22 Claims, 5 Drawing Sheets

(56) References Cited

U.S. PATENT DOCUMENTS

| | | | | |
|---|---|---|---|---|
| 8,662,893 B2* | 3/2014 | Schwendimann | ..... | B42D 15/00 434/85 |
| 2004/0070194 A1* | 4/2004 | Janetzke | ............... | G09F 3/0292 283/71 |
| 2004/0241385 A1* | 12/2004 | Huseman | ................. | A47K 3/38 428/99 |
| 2008/0050540 A1* | 2/2008 | Christofer | ................. | B44F 1/06 428/13 |
| 2008/0308613 A1* | 12/2008 | Freder | ....................... | B32B 7/06 229/80 |
| 2009/0026753 A1* | 1/2009 | Simske | ................ | B42D 25/405 283/70 |
| 2011/0212421 A1* | 9/2011 | Schwendimann | ..... | B42D 15/00 434/85 |
| 2012/0104743 A1* | 5/2012 | Mehta | .................... | B42D 25/29 283/95 |
| 2013/0255536 A1* | 10/2013 | Mehta | .................... | B42D 25/29 106/31.14 |
| 2014/0299254 A1* | 10/2014 | Rackovan | ................. | B65C 3/14 156/85 |
| 2014/0375046 A1* | 12/2014 | Wang | ..................... | B42D 25/21 283/81 |
| 2016/0096397 A1* | 4/2016 | Wakefield | ................ | B44F 1/10 428/29 |

* cited by examiner

REUSABLE NOTEBOOK

PRIORITY

This application claims the benefit of U.S. Provisional Patent Application No. 62/303,892, filed Mar. 4, 2016, and also claims the benefit of U.S. Provisional Patent Application No. 62/238,908, filed Oct. 8, 2015, each of which is incorporated herein, in its entireties, by reference.

RELATED APPLICATIONS

The subject matter of this application may be related to the subject matter of U.S. patent application Ser. No. 15/211,462, filed Jul. 15, 2016, which claims priority from U.S. Provisional Patent Application No. 62/193,915, filed Jul. 17, 2015, the disclosures of which are incorporated herein, in their entireties, by reference.

TECHNICAL FIELD

The present invention relates to a notebook, and more particularly to a notebook that can have its handwritten contents entirely erased by exposing the notebook to a heat source to heat thermochromic ink on the pages of the notebook to become clear so that the notebook can be reused multiple times. The present invention also relates to a kit that includes a notebook or paper that can be inserted into a heat source such as a microwave oven and a thermochromic ink pen that has ink with a critical temperature for changing states when exposed to the specified heat source producing a temperature at the location of the ink that is at or above the critical temperature for the thermochromic ink.

BACKGROUND

Thermochromic ink is widely available in industrial markets. Thermochromic ink has pigments that change color when subjected to a known temperature range. In a first state with first conditions, the thermochromic ink can be used to write on paper. In a second state, under second conditions, the thermochromic ink changes color. Pens with thermochromic ink, such as FriXion pens manufactured by the Pilot Pen Company turn clear when exposed to temperatures above 140 degrees Fahrenheit. Thermochromic ink pens are designed to be erasable in the following way: the person using the pen writes on the page with the thermochromic ink pen. Then the person rubs the writing with the rubber eraser, which creates friction, generating heat above 140 degrees Fahrenheit, and which turns the ink clear. Erasing a whole sheet of paper, several sheets of paper, or a whole notebook by hand would be tedious and would require too much time and effort to be a practical solution.

SUMMARY OF THE VARIOUS EMBODIMENTS

In accordance with one embodiment of the invention, a reusable notebook is used with heat-erasable ink. The reusable notebook includes a binding configured to hold a plurality of pages, at least one cover, and at least one ready indicator. The ready indicator is configured to indicate that at least one page in the notebook has reached at least a critical temperature. The critical temperature is a predetermined minimum temperature that is sufficient to erase thermochromic ink on the page(s). The indication occurs when the ready indicator is at a temperature equal to or above a predetermined minimum temperature referred to as the ready temperature. When the ready indicator is at or above the ready temperature, the critical temperature of the at least one page is reached.

Like many commercial notebooks, the notebook may include pages held together by the binding. Additionally, the notebook may have indicia printed on it with no-wax ink. Examples of some indicia include page lines, page numbers, bar codes or folio identifiers.

Among other things, the ready indicator may include thermochromic ink that is on at least one of the binding or the cover. To that end, thermochromic ink may printed on the cover or the binding. Additionally, or alternatively, the ready indicator may have a clear enclosure that holds a volume of thermochromic ink. Furthermore, the thermochromic ink may be in a container that is attached to the notebook.

The ready indicator can indicate that the at least one page has achieved the critical temperature by undergoing a change in visual properties. For example, the ready indicator may change color. In some embodiments, the ready temperature may be equal to the critical temperature. However, because of expected heat attenuation through the notebook, the ready temperature may be greater than the critical temperature. Thus, the ready indicator may use a thermochromic ink that has a ready temperature that is different from the critical temperature.

In order to reach the critical temperature, the notebook may be microwaved. To that end, the binding may be microwave safe and may withstand temperatures up to 250 degrees Fahrenheit. To ensure adequately uniform heating, a first ready indicator may be on a front cover of the notebook, and a second ready indicator may be on the back cover of the notebook. In illustrative embodiments, the first indicator indicates when a first half of the pages of the notebook are at a first critical temperature and the second indicator indicates when a second half of the pages of the notebook are at a second critical temperature. Furthermore, to assist in the prevention of overheating the notebook, the notebook may have a decoy guide. The decoy guide provides a location for a decoy object. The decoy object may be, for example, a mug filled with water. The decoy object absorbs some of the heat and assists with preventing overheating of various parts of the notebook.

In some embodiments, the ready indicator stops indicating that the critical temperature has been reached when the pages of the notebook are at or below a reversion temperature. In illustrative embodiments, the ready indicator may change its visual properties at or above a ready temperature, and may revert back to its original visual properties at or below a reversion temperature. The reversion temperature may be at or below the ready temperature. In some embodiments, the ink used to write in the notebook also has a notebook reversion temperature. However, the notebook reversion temperature may be less than the indicator reversion temperature.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

As used in this description and the accompanying claims, the following terms shall have the meanings indicated, unless the context otherwise requires:

A "notebook" is a bound set of pages or a binder used to bind a set of pages (e.g., a binder that allows for adding and removing pages, such as a ring or punchless grip binder). Thus, the pages of a notebook may be permanently bound in the notebook (e.g., using an adhesive or spiral binding) or may be inserted into the notebook (e.g., using a binding that can open and close, such as a ring or punchless grip binder). Each page of the set is typically (although not necessarily) rectangular. A page having rounded corners is "generally rectangular in shape" within the meaning of this definition.

A "set" has at least one member.

To "enhance" an image includes performing at least one function selected from the group consisting of noise filtering, sharpness enhancement, contrast enhancement, color saturation increase High Dynamic Range Imaging, and Super-resolution and combinations thereof.

To "erase" ink means to temporarily or permanently change the properties of the ink so that the ink is fully or substantially invisible relative to the page on which it is written or printed. However, just because ink has been "erased" does not mean that the ink itself has been removed from the page or that imprints left by a writing utensil are not still visible to the human eye or that the erasure is permanent. To "erase" a notebook or a page refers to erasing the ink on that page or in that notebook.

High Dynamic Range Imaging (HDRI) is a standard set of image enhancement techniques to use multiple camera images to compose a single image of greater dynamic range. https://en.wikipedia.org/wiki/High-dynamic-range_imaging Super-resolution is a standard set of image enhancement techniques that use multiple camera images to compose a single image of greater resolution. http://en.wikipedia.org.wiki/Superresolution A "camera-equipped computing device" is a computing device coupled to a camera, including but not limited to a camera-equipped smartphone, a camera-equipped tablet computer, a desktop computer with a usb-connected camera, and a laptop computer coupled to a camera.

A "computer process" performs a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process", we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "computer process" may be implemented using more than one processor or more than one (single- or multi-processor) computer.

In illustrative embodiments, a reusable notebook for use with thermochromic ink includes one or more ready indicators to indicate (e.g., visually and/or audibly) when some or all of the pages of the notebook have been sufficiently heated so as to effectively erase any thermochromic ink on the pages to make them ready for reuse. Specifically, notes are written or printed on the pages with thermochromic ink, and then the notebook is heated to erase previous thermochromic ink marks. The notebook has at least one ready indicator that lets a user know when some or all of the written contents of the notebook have been adequately heated, and thus, erased. The user can then stop the application of heat to the notebook, thereby preventing potential damage to the notebook.

Figure 1:
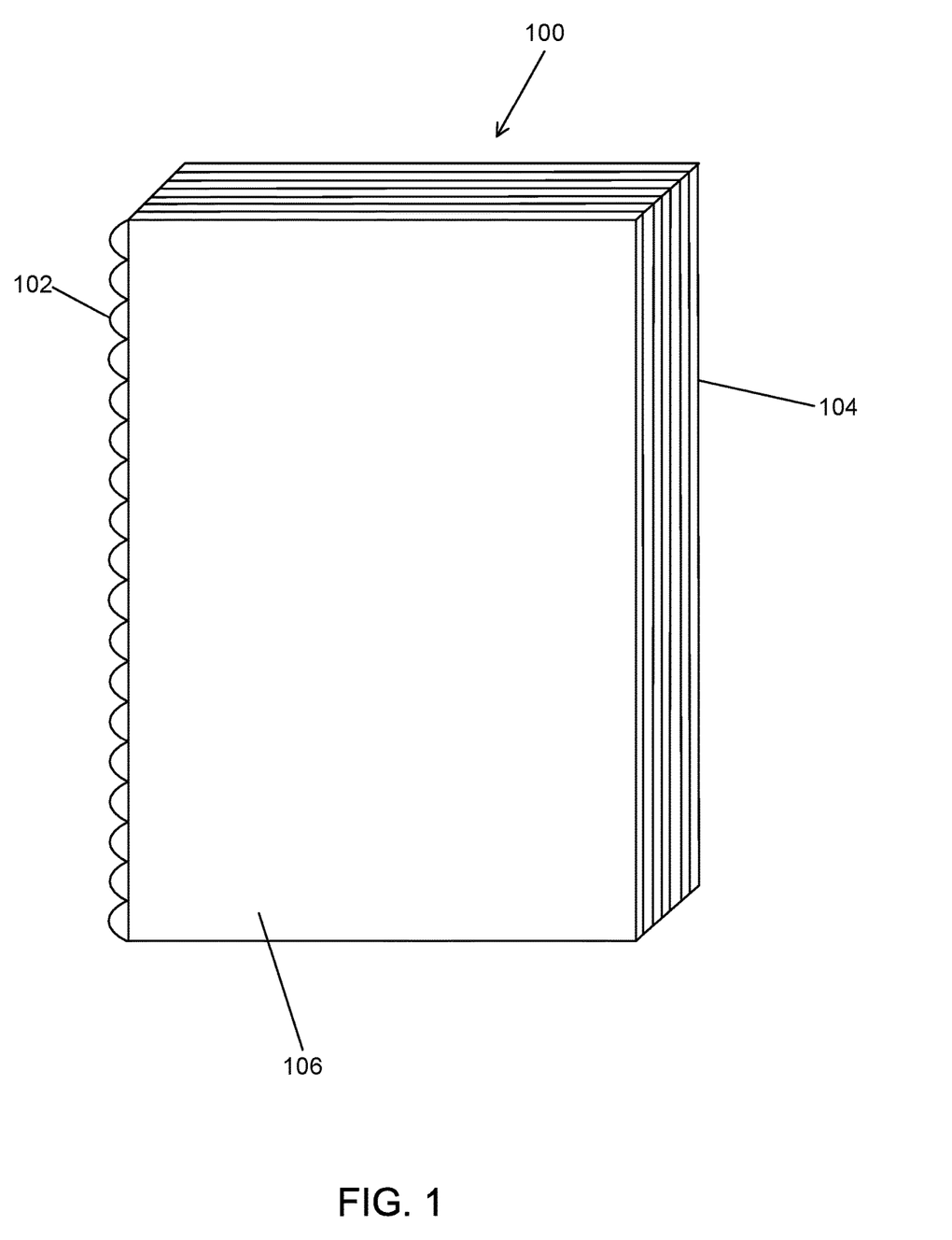
FIG. 1 schematically shows a notebook in accordance with certain illustrative embodiments of the invention FIG. 2 schematically shows the notebook of FIG. 1 with notes taken in thermochromic ink.

FIG. 1 schematically shows a notebook 100 in accordance with certain illustrative embodiments of the invention. In accordance with one embodiment of the invention, the notebook 100 is designed to be safely heated (e.g., in a microwave oven). Features include a binding 102 made from a material that is resistant to damage at high temperatures and, for some embodiments that allow for microwave heating, is microwave safe. Thus, in certain embodiments, the binding 102 may be made from a material such as polypropylene, high density polyethylene, or a silicone composite. The binding 102 holds together pages 104 of the notebook 100, which, as discussed above, may be permanently bound in the notebook 100 (e.g., using an adhesive or spiral binding 102) or may be inserted into the notebook 100 (e.g., using a binding 102 that can open and close, such as a ring or punchless grip binder). The notebook 100 may include a variety of page 104 sizes, counts, and types. For example, the notebook 100 may have 80 pages 104 that measure 8.5"×9.5". Furthermore, the pages 104 may be, for example, 80-100 lb. stock and/or fine-grain and acid-free paper. Preferably, the pages 104 are not formed of recycled paper, as recycled paper may have trace levels of metals that could result in damage to the notebook 100 and/or microwave oven if heated in a microwave oven.

In accordance with illustrative embodiments of the invention, various types of notebooks 100 can be produced, e.g., having different numbers of pages 104, different types of pages 104 (e.g., different weights and/or materials), different types of bindings 102 (e.g., adhesive vs. non-adhesive bindings 102), different types of covers 106 (e.g., paper vs. plastic), and/or other features typically associated with notebooks 100 (e.g., with or without dividers, with or without pockets, etc.). It is not necessary that all of the pages 104 be of identical size and/or type. Furthermore, the notebook 100 may have a cover 106 (typically including a front cover and a back cover). The cover 106 may be a different size and/or type of material than the pages 104. For example, the cover 106 may be of a heavier paper stock or different material than the pages 104. Alternatively, the cover 106 may be a cover page 104 having the same properties as any of the other pages 104. These variations can lead to a variety of prices for the notebooks 100. Notebooks 100 that have additional features and/or functions than standard notebooks 100 may have an increased cost. For example, see notebooks 100 described in U.S. patent application Ser. No. 15/211,462, filed Jul. 15, 2016, and in U.S. Provisional Patent Application No. 62/193,915, filed Jul. 17, 2015, each of which was incorporated by reference above. Accordingly, illustrative embodiments of the invention provide a reusable notebook 100.

Figure 2:
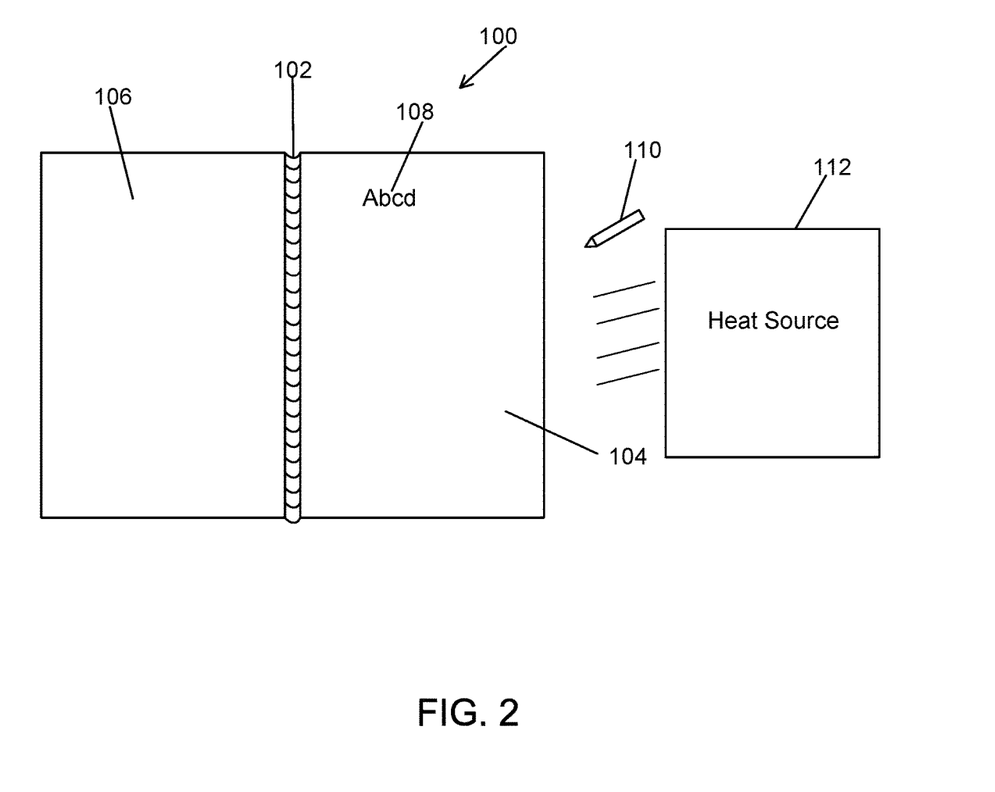

FIG. 2 schematically shows the notebook 100 of FIG. 1 with notes written in erasable ink 108. In an embodiment of the invention, a whole page 104 or a whole notebook 100 can be erased conveniently. The notebook 100 includes one or more pages 104 written or printed with thermochromic ink 108 (e.g., handwritten by a user using a thermochromic ink pen 110 or printed such as by an ink jet printer filled with thermochromic ink 108). The user then erases the page 104 and/or notebook 100 by exposing it to an external heat source 112 so as to raise the temperature of the pages 104 to a temperature greater than that required by the thermochromic ink 108 to change states. The temperature required to change the visual properties of the thermochromic ink 108 for erasure may be referred to as the "critical temperature."

It is known that there are different types of thermochromic inks 108 that have different characteristics, such as, for example, different colors at room temperature, different critical temperatures for erasing the thermochromic ink 108, and different erasure characteristics (e.g., some inks 108 may change color at the critical temperature, while other inks 108 may become clear or lighter or opaque at the critical temperature). Some inks 108 remain permanently erased after reaching the critical temperature, while other inks 108 can return to the original color when the ink 108 temperature falls below some baseline temperature also referred to as a "reversion temperature." For example, some inks 108 return to original color when the ink 108 temperature falls below the critical temperature (i.e., the reversion temperature may be substantially equal to the critical temperature), some inks 108 return to original color when the ink 108 temperature returns to room temperature (i.e., the reversion temperature may be below the critical temperature but within a typical ambient temperature range in which the notebook is likely to be used), and some inks 108 return to original color at cold temperatures (e.g., below around 15 degrees Fahrenheit).

For example, the critical temperature of ink 108 from the Pilot FriXion pen 110 is approximately 140 degrees Fahrenheit (i.e., the temperature at which the ink 108 changes visually from black to clear) and the reversion temperature at which the ink 108 changes visually from clear black to black is approximately 15 degrees Fahrenheit. Thus, the ink 108 would be black at a temperature of less than 140 degrees Fahrenheit, and clear when it reaches a temperature of more than 140 degrees Fahrenheit. Then, if desired, the ink 108 will revert to black again once it is at, or below, the reversion temperature (i.e. 15 degrees Fahrenheit). Generally speaking, the notebook 100 will be configured to be used within a predetermined ambient temperature range (e.g., 20-125 degrees Fahrenheit) with a thermochromic ink 108 that has a critical temperature above the ambient temperature range (e.g., above approximately 140 degrees Fahrenheit) and does not return to original color when the ink temperature is back within the ambient temperature range.

In some instances, it may be undesirable to have the ink 108 return to the first color. For example, if a user heats the ink 108 to the critical temperature so that it turns clear, the notebook 100 may be reused. However, if the critical temperature and the reversion temperature are the same, the ink 108 will return to the first color once it cools (e.g., the ink 108 reappears). To that end, in some preferred embodiments, the ink 108 used to write notes does not transition back to the first color (i.e., has no reversion temperature). In an alternative preferred embodiment, the ink 108 may have a low reversion temperature, such as, for example, 15 degrees Fahrenheit. Illustrative embodiments of the invention provide a convenient way to erase the page 104, several pages 104, or the entire notebook 100 so that page 104 may be used again. Pages 104 may also be referred to as paper 104, however, illustrative embodiments are not intended to be limited to paper pages.

Generally speaking, the external heat source 112 may be, for example, a hair dryer, heat gun, warming tray, oven, microwave oven, or heating pad. When the heat source 112 is applied such that the ink 108 reaches the critical temperature, the properties of the ink 108 are changed so that the ink 108 becomes fully or substantially invisible relative to the page 104 on which it is written or printed (e.g., turns clear or turns opaque or changes to a second color). Thus, the heat source 112 effectively erases all, or substantially all, of the ink 108 on the page 104. Accordingly, the heat source 112 must be capable of obtaining the critical temperature for the thermochromic ink 108 at the location of the ink 108 to be erased. For example, if the notebook 100 is used and writing occurs on the middle page 104 of the notebook 100, the heat source 112 should be capable of raising the temperature of the middle page 104 to the critical temperature. Thus, in this embodiment, the heat source 112 will need to be able to increase the temperature of the core of the notebook 100 to the critical temperature. Once the critical temperature is reached, the ink 108 will be erased and the notebook 100 can be reused.

It should be noted that this process of erasing the ink 108 does not necessarily remove the ink 108 from the page 104, but instead merely changes the physical properties of the ink 108 so that it is no longer visible, as described above.

Figure 3:
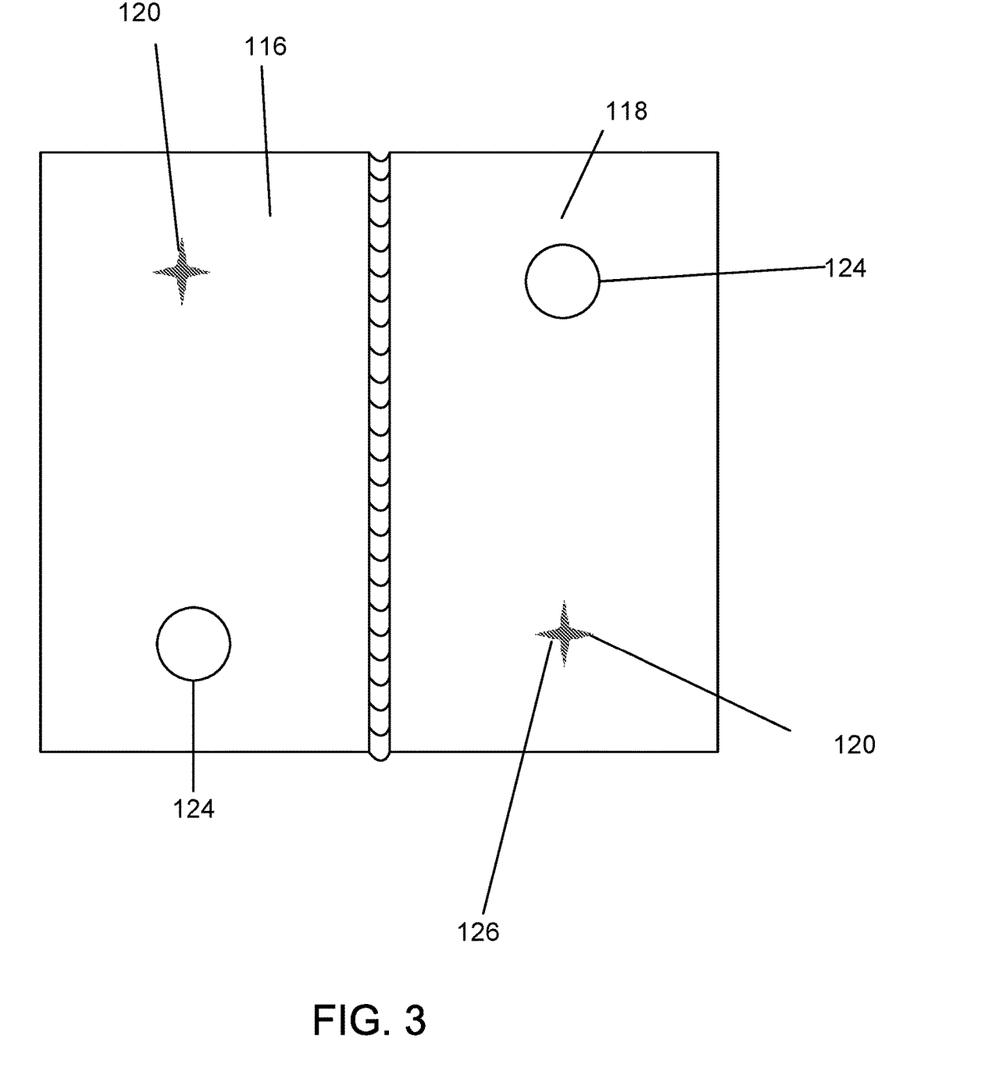
FIG. 3 schematically shows an exemplary front and rear cover of a notebook in accordance with illustrative embodiments of the invention.

FIG. 3 schematically shows an exemplary front cover 118 and rear cover 116 of the notebook 100 in accordance with illustrative embodiments of the invention. The notebook 100 includes at least one "ready indicator" 120 (e.g., on the front cover 118, the back cover 116, the binding 102, and/or one or more sides of the notebook 100) that undergoes a change in visual properties (e.g., changing from one color to another color, from a color to transparent, from transparent to a color, from clear to opaque, or from opaque to clear) at a predetermined temperature (referred to herein as the "ready temperature") to indicate that at least some of the notebook pages 104 (e.g., all, substantially all, or half of the notebook pages 104) have reached the critical temperature for the thermochromic ink 108 (e.g., 140 degrees Fahrenheit for certain thermochromic inks). In the example shown in FIG. 3, both the front cover 118 and the back cover 116 include the ready indicator 120. When the Ready indicator 120 undergoes the change in visual properties at the ready temperature, it indicates that the notebook 100 (or at least some portion of the notebook 100) has been erased and is "ready" to be reused.

The ready indicator 120 may provide a visual and/or audible indication that the temperature of the ink 108 has reached the critical temperature. This allows the user to quickly determine whether the object (e.g., notebook 100) is ready for use. To that end, the ready indicator 120 may include a thermometer. Additionally, or alternatively, the ready indicator 120 may be formed from any material that changes color, including but not limited to thermochromic ink 126 (referred to as "indicator ink 126"). In some embodiments, the indicator ink 126 has the same or substantially the same critical temperature as the ink 108 used to write in the notebook 100. Depending on the properties of the pages 104 and the thickness of the notebook 100, an indicator ink 126 with an appropriate critical temperature is chosen. For example, the critical temperature of the indicator ink 126 should be higher for notebooks 100 with 250 pages 104 than for a notebook 100 of 50 pages 104. This is because more heat is required to erase the ink 108 in the thicker notebook 100, and thus, the indicator 120 should be configured to provide an indication once the requisite temperature inside the notebook 100 has been achieved. Accordingly, the indicator 120 on the surface of the notebook 100 is chosen to have a critical temperature that accounts for heat attenuation as heat travels through the notebook 100.

In accordance with some embodiments of the invention, the ready indicator 120 includes thermochromic ink 126 that is either printed onto the notebook 100 or placed in a container that is attached to the notebook 100. For example, the indicator ink 126 may be contained within a plastic bubble. If the indicator ink 126 is in substantially a liquid phase, it is beneficial to house it within a see-through container. Persons of skill in the art will understand that the choice of container may further lead to attenuation of heat, and thus, the properties of the indicator ink 126 must account for such attenuation.

As discussed above, unlike the thermochromic ink 108 used to write in the notebook 100, which turns opaque or clear when heated above its critical temperature and then remains opaque or clear even when the notebook 100 falls below this critical temperature, indicator ink 126 used for the ready indicator 120 changes visual properties above its critical temperature and returns to its original visual properties below its critical temperature. Thus, the indicator ink 126 used for the ready indicator 120 generally would be different than the thermochromic ink 108 used to write in the notebook 100.

Figure 4A:
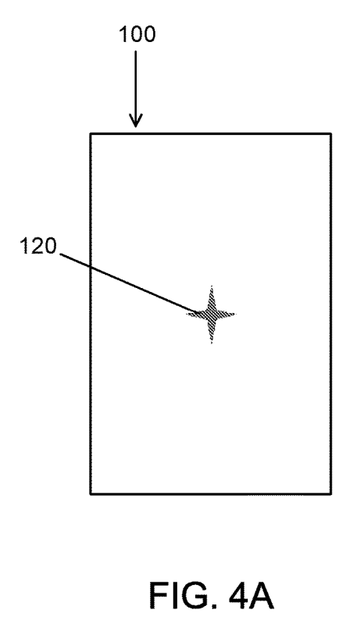
FIGS. 4A-4C schematically show a variety of different configurations that the ready indicators may take in accordance with illustrative embodiments of the invention.
Figure 4B:
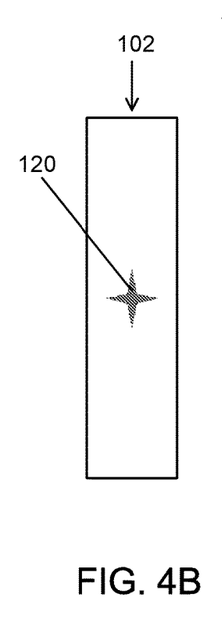
Figure 4C:
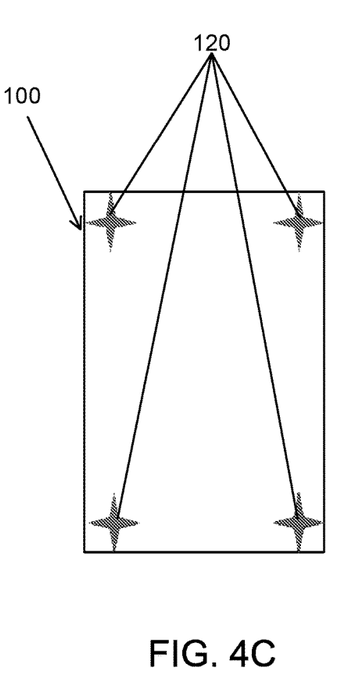

In various embodiments, the notebook 100 may have one ready indicator 120, two ready indicators 120, or three or more ready indicators 120. FIGS. 4A-4C schematically show a variety of different configurations that the ready indicators 120 may take. In FIG. 4A, the indicator 120 is applied at the center of the notebook 100. Thus, the indicator 120 has been configured that when the outside center of the notebook 100 has reached the ready temperature, the notebook 100 should stop being heated. As discussed, the ready temperature may indicate that the notebook 100 should stop being heated because it has been entirely erased. However, in some embodiments, the ready indicator 120 is configured with a ready temperature that indicates when half of the notebook 100 has been erased, as will be discussed further below.

FIG. 4B schematically shows the indicator 120 may be placed on the side of the notebook 100, for example, on the binding 102. This configuration may be used in addition to, or alternatively, from the configuration shown in FIG. 4A. FIG. 4C schematically shows a plurality of indicators 120 placed on a cover 106 of the notebook 100. Again, this configuration may be used additionally, or alternatively, to any of the other configurations shown. It should be understood that the illustrated indicators 120 are not intended to limit the placement or number of indicators 120 which may be used. In the embodiment shown in FIG. 4C, the indicators 120 are spread around the corners of the cover 106. Such an arrangement allows for a precise indication of whether various parts of the notebook 100 are being heated adequately and/or uniformly. Additionally, one of the ready indicators 120 may also be a stop indicator. The stop indicator may be similar to the ready indicator, except that the ink 126 used has a stop temperature that indicates that the notebook 100 is at a temperature that potentially could damage the notebook 100.

It should be noted that different notebook 100 embodiments may have different ready temperatures even when intended for use with thermochromic inks 108 having a particular critical temperature. For example, the ready temperature generally will depend on such things as the number of pages 104 in the notebook 100, the composition and thickness of the pages 104, the composition and thickness of the covers 106, the composition and thickness of the binding 102, and whether the ready indicator 120 is intended to indicate that all or only some of the pages 104 are erased, among others. Therefore, persons of ordinary skill in the art generally will need to select the appropriate ready indicator 120 having an appropriate ready temperature for a given notebook 100 embodiment, and such selection should not require undue experimentation.

In some embodiments, the ready indicator 120 returns to its original visual property when the temperature falls below the ready temperature.

Illustrative embodiments of the invention provide a reusable notebook 100. To that end, it is important that the notebook 100 be heated at appropriate amount. Too little heat will result in inadequate and/or uneven erasure of ink 108. This may be undesirable to users who wish to write over old ink 108 marks. Alternatively, too much heat may cause burning and/or distortion of parts of the notebook 100 (e.g., the pages 104), which may make the notebook 100 less desirable. To that end, the notebook 100 may have two ready indicators 120. As can be seen in FIG. 3, the notebook 100 may have ready indicators 120 on both covers 116 and 118. In order to ensure an even exposure of heat to various parts of the notebook 100, the ready indicator 120 may be configured to indicate when half of the notebook 100 has received adequate heat from the heat source 112 (i.e., when half of the notebook 100 has been erased). The user may then flip the notebook 100 over (e.g., so the other half is facing and/or receiving most of the heat) and further heat the notebook 100. Thus, the notebook 100 is more evenly heated, preventing unintended over or under heating.

Returning to FIG. 3, to further assist with preventing overheating of the notebook 100, some embodiments of the invention include at least one "decoy guide" 124 (e.g., on the front cover 118 and/or back cover 116). The decoy guide 124 on the cover 106 marks a location where the decoy object may be placed. In illustrative embodiments, the ready indicator 120 is 2.5 inches away from the decoy guide. It should be recognized that the ready indicator 120 and decoy guide 124 can be placed on a cover 106 (either front 118 or back 116) or placed on both covers 116 and 118. Additionally, or alternatively, the decoy guide 124 and ready indicator 120 may be placed on any page 104 of a notebook 100 or on loose paper.

The decoy guide 124 assists with placement of an object ("decoy object") that absorbs some heat. For example, when the heat source 112 is a microwave, the decoy object is placed in the microwave oven with the notebook 100, so as to effectively reduce the rate at which the notebook 100 absorbs microwaves. This heats the notebook 100 in a slower, more controlled manner and reduces the chance for damage that could be done by microwave ovens, especially microwave ovens that are particularly powerful. The "decoy object" could be a mug partially filled with water.

Depending on the dimensions of the microwave and the size of the notebook 100, the decoy object may not fit next to the notebook 100. The decoy guide 124 thus provides a location on the notebook 100 on which to place the decoy object. Furthermore, the inventors have found that placing the decoy object on the notebook 100 further ensures the heating of the notebook 100 is controlled/reduced. Thus, in accordance with some embodiments of the invention, the notebook 100 additionally includes at least one decoy guide 124, e.g., on the front cover 118 and/or the back cover 116 to indicate where the decoy object should be placed.

As expressed above, the decoy object absorbs thermal energy so that the pages 104 do not become burned. This is especially useful where the heat source 112 is a microwave. The decoy object absorbs some microwaves so as to not reduce the water content of the page so to help prevent changes in color or burning. It should be recognized that the decoy object need not be part of the notebook 100, and may be a cup filled with water that is placed inside of the microwave along with the notebook 100.

In accordance with some embodiments of the invention, the notebook covers 106 are made of a material that protects the pages from food particles that might already be in the microwave or conventional oven.

In accordance with some embodiments of the invention, protective notebook covers 106 are made of microwave-safe materials such as polypropylene, high-density polyethylene, silicone composite, or a coating made of microwave safe polymers that are widely available on the market of commercial printing coatings including aqueous polymer coating or an ultraviolet-curing polymer coating.

In accordance with some embodiments of the invention, any information printed onto the notebook 100 that is not intended to be erased (e.g., page lines, page numbers, logos, bar codes, etc.) are preferably printed with no-wax inks. While no-wax inks are widely available in commercial print applications, no-wax inks are usually only used for print jobs that require additional layers of ink, so that additional layers will stick to lower layers. Using no-wax ink for the heat-to-erase notebook 100 or paper helps ensure that the ink 108 will remain on the page 104 and will not stick to additional pages 104 when exposed to high temperatures.

In accordance with some embodiments of the invention, pages 104 are made of a paper stock or other material with a "smooth finish" or "hard finish" so as to minimize indentation made by pens and maximize the number of times the notebook 100 can be reused.

In accordance with some embodiments of the invention, pages 104 are made of a paper stock or other material with a slight tint that matches the slight tint left in erased thermochromic ink 108 residue that is left on the page 104, so as to minimize the visibility of erased thermochromic ink 108 and maximize the number of times the notebook 100 can be reused.

Figure 5:
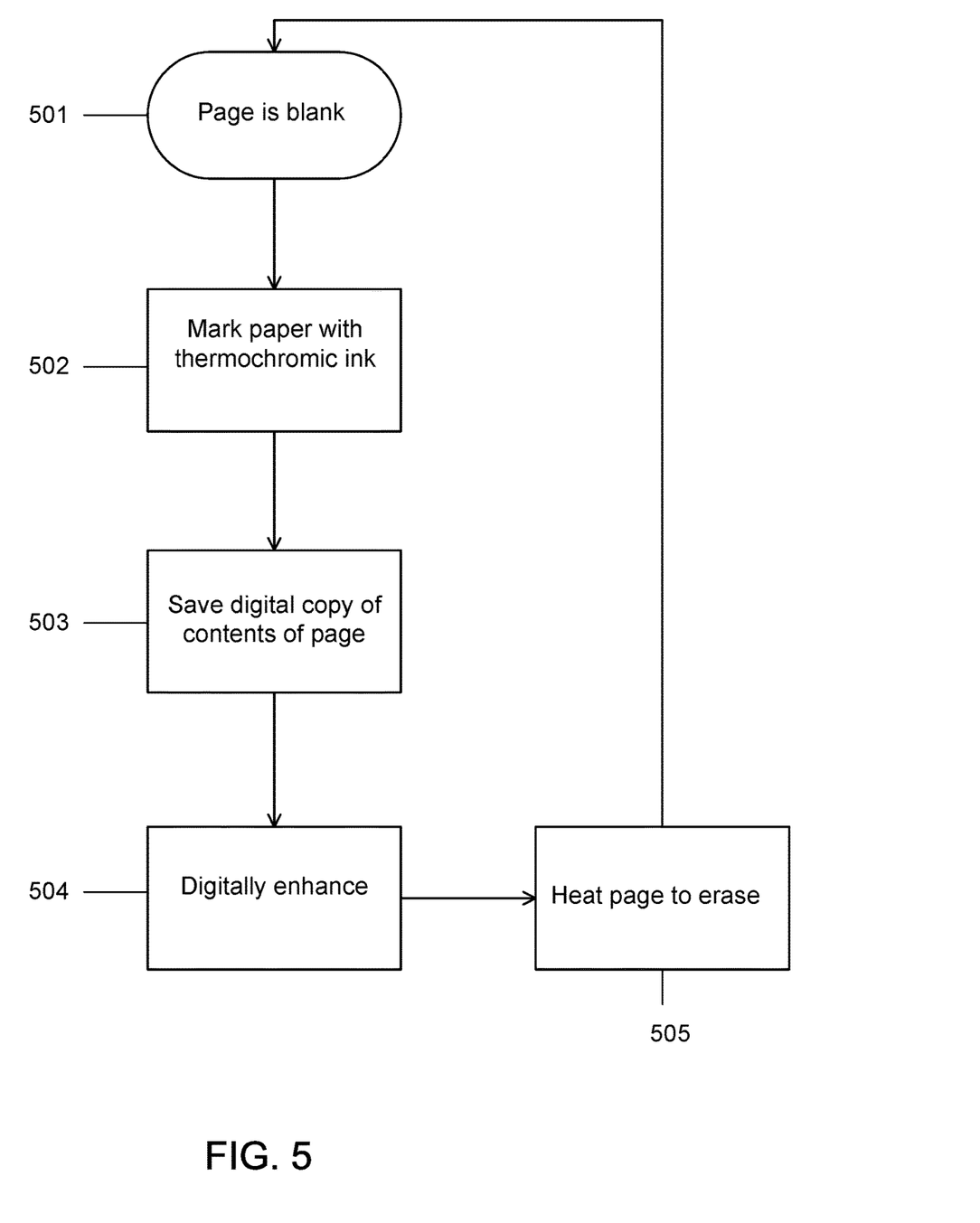
FIG. 5 shows a process of using the notebook in accordance with illustrative embodiments of the invention.

FIG. 5 shows a process of using the notebook in accordance with illustrative embodiments of the invention. The process begins with the presentation of blank pages 501. As mentioned above, pages may be referred to as paper without any intent to limit illustrative embodiments of the invention. Content is written or printed on paper with thermochromic ink at step 502. As described above, the paper may be part of a bound notebook or the paper may be separate and loose. The paper is exposed to heat 505 to return it to its original state so content can be written or printed on it again, which will be described further below. The process can be repeated multiple times. As expressed above, different heating techniques can be employed to heat the paper and thereby the ink on the paper to the critical temperature for thermochromic transition of the ink between a visible state (e.g. black ink, blue ink etc.) and a clear state.

Optionally, at step 503, the contents written on the originally blank paper can be saved with a digital scanner prior to heating the paper and clearing the contents. After the user writes on the paper with thermochromic ink, the paper can be scanned by a digital scanning process or by taking a digital photograph and performing digital signal processing on the digital photograph to capture and retain the content in a suitable format. For example; the digital content may be saved in a format such that OCR (optical character recognition) may occur for the digital content. Furthermore, at step 504, the digital photographs or scan may optionally undergo enhancement in a computer process for enhancing each image. These processes are described in U.S. patent application Ser. No. 15/211,462, filed Jul. 15, 2016, and in U.S. Provisional Patent Application No. 62/193,915, filed Jul. 17, 2015, each of which was incorporated by reference above. After the contents of the paper have been digitized and saved to an appropriate storage location, the paper can be heated to the critical temperature for the thermochromic in order to change the color of the ink on each page so that the ink color is clear.

The next step 505 in the process heats the paper to erase the ink. As described above, in some embodiments, the notebook is microwaved. A decoy guide provides a location for a decoy object, such as a mug filled with water. In illustrative embodiments, the notebook may be microwaved to erase the thermochromic ink without damaging the notebook. However, it is not necessary to use a decoy object or a decoy guide to prevent damage to the notebook. Indeed, illustrative embodiments may be placed in the microwave without a decoy object and/or the notebook may not have a decoy guide. The notebook may be heated at a low setting, such as defrost. This lower heat setting may prevent the notebook from being damaged even in the absence of a decoy object.

In some other embodiments, to erase the notebook, the notebook is placed front cover up and a decoy object such as a mug of water is placed on the decoy guide on the front cover. The notebook is heated until the thermochromic ready indicator on the front cover changes color to indicate the notebook has been erased. In other words, the indicator has reached the ready temperature. In some embodiments, the ready temperature indicates that the entire notebook is ready. In some other embodiments, the ready temperature indicates that one side of the notebook is ready. In illustrative embodiments, the notebook is flipped over and placed in the microwave again with the rear cover facing up, and with the decoy object on the decoy guide on the rear cover. The notebook is heated until the Ready indicator on the rear cover changes color to indicate ready. This time, the indicator on the rear cover has reached the ready temperature. Thus, the notes inside the notebook should have reached at least the critical temperature, and thus, the notebook is erased.

It should be recognized by those of ordinary skill in the art that the ready indicator may be produced using a different thermochromic ink than the ink that is used to write within the notebook. The ready indicator may have a higher critical temperature than the ink. The ready indicator may be calibrated such that when the temperature of the ready indicator reaches its critical temperature at least half of the pages within the notebook will have been erased (i.e. the ink turned to a clear color). This presumes that the microwave will either expose the top or bottom half of the notebook to more microwave energy and the temperature reached at the center of the book will be at the critical temperature for the thermochromic ink. In such a fashion, when the book is flipped in the microwave and the second ready indicator changes color, this will be indicative that at least half of the pages within the notebook have changed color and therefore the entire book will then be erased. It should be recognized that if a consistent microwave source can be produced that heats both the top and the bottom of the notebook equally, only a single ready indicator may be necessary and the notebook may not need to be flipped in order to erase all of the pages.

It should be recognized that a notebook and thermochromic pen with instructions for using the pen with the notebook and erasing the notebook using a heat source may be sold together in the form of a packaged kit.

Illustrative embodiments of the present invention may be described, without limitation, by the above description. While these embodiments have been described in the clauses by process steps, an apparatus comprising a computer with associated display capable of executing the process steps in the clauses above is also included in the present invention. Likewise, a computer program product including computer executable instructions for executing the process steps in the clauses and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A reusable notebook for use with heat-erasable ink, the reusable notebook comprising:
    a binding configured to hold a plurality of pages;
    at least one cover; and
    at least one ready indicator configured to indicate that at least one page in the notebook has reached at least a critical temperature, the critical temperature being a predetermined minimum temperature sufficient to erase thermochromic ink on the at least one page,
    the indication occurring at a temperature equal to or above a ready temperature, the ready temperature being a predetermined minimum temperature of the ready indicator that indicates the at least one page has reached the critical temperature.

2. The notebook as defined by claim 1, wherein the ready indicator comprises thermochromic ink on at least one of the binding or the cover.

3. The notebook as defined by claim 2, wherein the ready indicator uses a thermochromic ink that has a ready temperature different from the critical temperature.

4. The notebook as defined by claim 1, wherein the ready indicator comprises a clear enclosure holding a volume of thermochromic ink.

5. The notebook as defined by claim 1, wherein the binding is microwave safe and can withstand temperatures up to 250 degrees Fahrenheit.

6. The notebook as defined by claim 1, wherein the ready indicator indicates that the at least one page has achieved the critical temperature by undergoing a change in visual properties.

7. The notebook as defined by claim 1, wherein the ready temperature is equal to the critical temperature.

8. The notebook as defined by claim 1, wherein the ready temperature is greater than the critical temperature.

9. The notebook as defined by claim 1, wherein the ready indicator comprises thermochromic ink printed on at least one of a cover or the binding of the notebook.

10. The notebook as defined by claim 1, wherein the ready indicator includes a thermochromic ink in a container attached to the notebook.

11. The notebook as defined by claim 1, wherein the ready indicator stops indicating that pages of the notebook have reached at least a critical temperature when the ready indicator is at and/or below a reversion temperature.

12. The notebook as defined by claim 11, wherein the ready indicator changes its visual properties at or above a ready temperature and reverts back to its original visual properties at or below an indicator reversion temperature, the indicator reversion temperature being at or below the ready temperature.

13. The notebook as defined by claim 12, wherein the ink used to write in the notebook also has a notebook reversion temperature, the notebook reversion temperature being less than the indicator reversion temperature.

14. The notebook as defined by claim 1, further comprising a decoy guide.

15. The notebook as defined by claim 1, further comprising a decoy object.

16. The notebook as defined by claim 1, wherein a first ready indicator is on a front cover of the notebook, and a second ready indicator is on a back cover of the notebook.

17. The notebook as defined by claim 16, wherein the first indicator indicates a first critical temperature for a first half of pages of the notebook, and wherein the second indicator indicates a second critical temperature for a second half of pages of the notebook.

18. The notebook as defined by claim 1, where indicia printed on the notebook includes no-wax ink.

19. The notebook of claim 18, wherein the indicia includes at least one of page lines, page numbers, bar codes or folio identifiers.

20. The notebook of claim 1, wherein the binding holds a plurality of pages together.

21. The notebook of claim 1, wherein the ready indicator changes visual appearance from a first color to a second color when the temperature of the ready indicator is at or above the ready temperature.

22. The notebook of claim 1, wherein the notebook is microwaved to get the at least one page to the critical temperature.

* * * * *